United States Patent
Reed et al.

(10) Patent No.: US 9,477,894 B1
(45) Date of Patent: Oct. 25, 2016

(54) SYSTEM AND METHOD FOR MEASURING OBJECT HEIGHT FOR OVERHEAD CLEARANCE DETECTION

(71) Applicant: FORD GLOBAL TECHNOLOGIES, LLC, Dearborn, MI (US)

(72) Inventors: Eric L. Reed, Livonia, MI (US); Thomas Lee Miller, Ann Arbor, MI (US); Cameron Smyth, Wyandotte, MI (US); Jacob Lucero, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/845,544

(22) Filed: Sep. 4, 2015

(51) Int. Cl.
*G08G 1/0967* (2006.01)
*G06K 9/00* (2006.01)

(52) U.S. Cl.
CPC ....... *G06K 9/00805* (2013.01); *G06K 9/00791* (2013.01)

(58) Field of Classification Search
CPC .................. G06K 9/00805; G06K 9/00791
See application file for complete search history.

(56) References Cited

U.S. PATENT DOCUMENTS

| | | | |
|---|---|---|---|
| 7,688,187 B2 * | 3/2010 | Caird ...................... | B60Q 9/00 340/425.5 |
| 7,797,881 B2 * | 9/2010 | Loitherstein ............ | E05F 15/74 340/932.2 |
| 7,877,209 B2 | 1/2011 | Harris et al. | |
| 8,354,920 B2 | 1/2013 | Kole | |
| 2012/0139756 A1 * | 6/2012 | Djurkovic ............... | G08G 1/04 340/905 |
| 2013/0110346 A1 | 5/2013 | Huber | |
| 2013/0222592 A1 | 8/2013 | Gieseke | |
| 2016/0171892 A1 * | 6/2016 | Gieseke ................... | G08G 1/04 348/148 |

FOREIGN PATENT DOCUMENTS

WO    2014048995 A1    4/2014

* cited by examiner

*Primary Examiner* — Van Trieu
(74) *Attorney, Agent, or Firm* — Frank MacKenzie; Brooks Kushman P.C.

(57) ABSTRACT

An overhead clearance system for a vehicle is configured to receive signals from wireless transceivers attached to objects that are towed or carried by the vehicle and extend above a top of the vehicle. A controller is programmed to receive the signals from the wireless transceivers and transmit a request to a remote device to send height data associated with the object and the vehicle. The controller outputs an alert when combined object and vehicle heights exceed a sensed vertical clearance.

20 Claims, 4 Drawing Sheets

SYSTEM AND METHOD FOR MEASURING OBJECT HEIGHT FOR OVERHEAD CLEARANCE DETECTION

TECHNICAL FIELD

This application generally relates to determining total vehicle height for an overhead clearance detection system for a vehicle.

BACKGROUND

It is common for vehicle operators to transport items that extend above a roofline of a vehicle. Items may be transported on a roof of the vehicle. For example, a cargo carrier may be attached to the roof to accommodate additional luggage. A roof mounted bicycle rack may be attached to transport bicycles. Items that extend above the roofline may be transported in a bed of a truck. Further, the vehicle may tow a trailer that extends above the roofline of the vehicle.

When an object or trailer is present that extends above the roofline, vertical clearance of the vehicle may be an issue. The vertical clearance of the vehicle is that elevation of an overhead object that the vehicle can safely pass under. Typical overhead objects may be a bridge or a garage. Objects transported on the roof of the vehicle decrease the vertical clearance of the vehicle. A problem occurs when a total height of the vehicle and roof-mounted object is less than the vertical clearance. For example, a bicycle mounted on a vehicle roof that is entering a garage with a standard vertical clearance may make contact with the garage.

SUMMARY

In some configurations, an overhead clearance detection system for a vehicle includes a controller programmed to, in response to receiving a signal from a wireless transceiver coupled to an object in proximity to the vehicle, transmit a request to a remote device to measure an object height above a top of the vehicle and, after receiving height data from the remote device, output an alert when combined object and vehicle heights exceed a sensed vertical clearance.

Some configurations may include one or more of the following features. The overhead clearance detection system in which the height data includes an image containing the vehicle and the object and the controller is further programmed to generate the combined object and vehicle heights based on the image. The overhead clearance detection system in which the height data includes the object height above the top of the vehicle. The overhead clearance detection system in which the height data includes the combined object and vehicle heights. The overhead clearance detection system in which the signal includes an identifier that is associated with the object and the controller is further programmed to store the identifier and associated height data in non-volatile memory of the controller. The overhead clearance detection system in which the controller is further programmed to, in response to receiving the signal, compare the identifier with stored identifiers and, when the identifier matches one of the stored identifiers, output a prompt to a user interface permitting an operator to select between operating with stored height data associated with the one of the stored identifiers and requesting a measurement of the object height. The overhead clearance detection system in which the controller is further programmed to receive a user assigned object name associated with the object from the remote device and store the user assigned object name in non-volatile memory of the controller. The overhead clearance detections system in which the height data includes a pixel height of the object and a pixel height of the vehicle. The overhead clearance detection system in which the height data includes a ratio of the object and vehicle heights.

In some configurations, a vehicle includes a controller programmed to, in response to receiving a signal from a wireless transceiver coupled to an object in proximity to the vehicle, transmit a request to a remote device to send height data for the vehicle and the object and, after receiving the height data, output an alert when a combined height of the vehicle and the object exceeds a sensed vertical clearance.

Some configurations may include one or more of the following features. The vehicle in which the height data includes an image depicting the vehicle and the object. The vehicle may include a display, in which the controller is further programmed to output the image to the display and superimpose operator moveable reference lines corresponding to a wheel-ground interface, a top of the vehicle and a top of the object on the image. The vehicle in which the controller is further programmed to compute a height of the object based on a ratio of pixel distances between the moveable reference lines. The vehicle in which the height data includes the combined height. The vehicle in which the controller is further programmed to send height data for the object to the wireless transceiver coupled to the object.

In some configurations, a method includes receiving, by a controller, a signal indicative of a presence of an object in proximity to a vehicle. The method also includes requesting, by the controller, a remote device to provide height data. The method also includes receiving, by the controller, height data from the remote device. The method also includes outputting, by the controller, an alert when a combined height of the vehicle and the object derived from the height data is greater than a measured vertical clearance.

Some configurations may include one or more of the following features. The method may include capturing, by the remote device, an image that includes the vehicle and the object. The method may include superimposing, by the remote device, a plurality of reference lines on the image, in which the reference lines correspond to a top of the vehicle, a bottom of the vehicle, and a top of the object, and estimating a height of the object based on the image and the reference lines. The method in which the height data includes the image. The method may include, processing, by the controller, the image to estimate the combined height.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
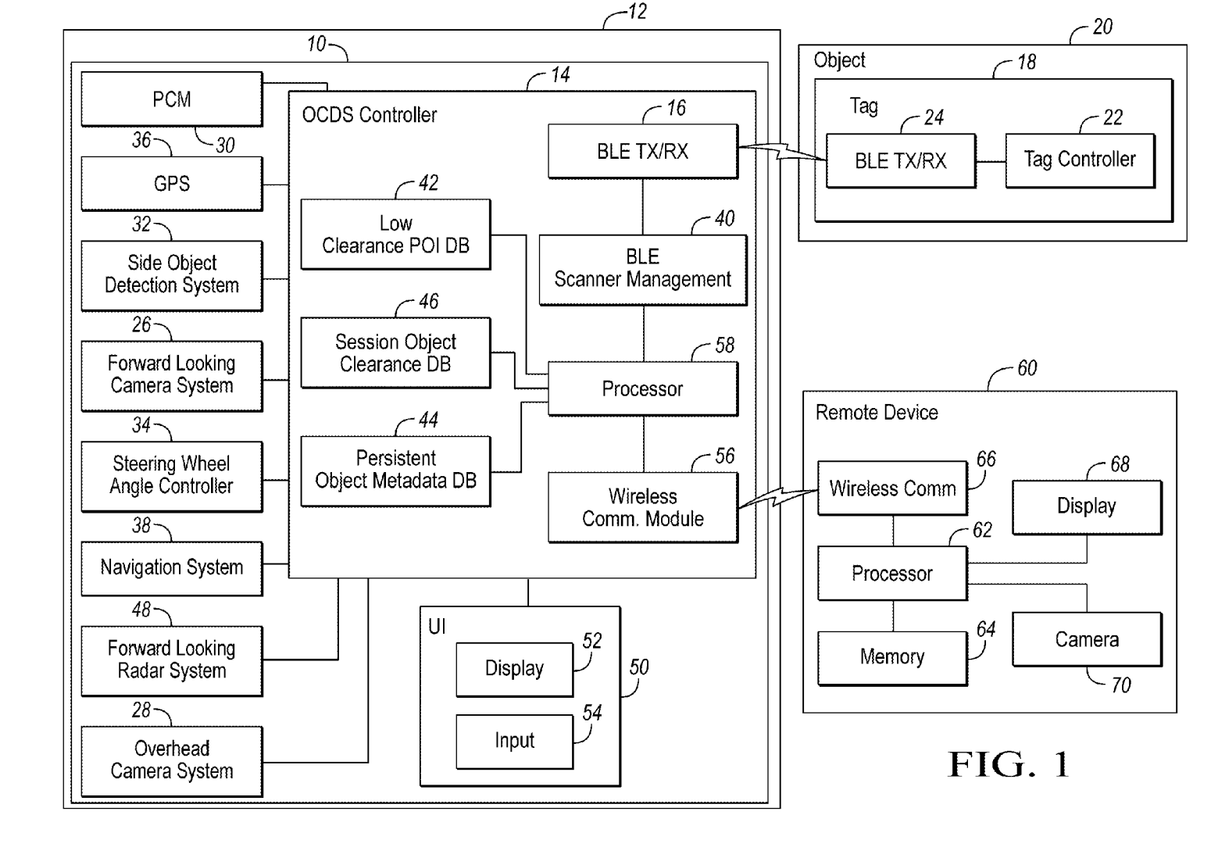
FIG. 1 depicts a block diagram of a vehicle including an overhead clearance detection system, a remote device, and a tag coupled to an object in proximity to the vehicle.

FIG. 1 depicts a vehicle 12 that includes an overhead clearance detection system (OCDS) 10 for actively determining height clearance and generating alerts within the vehicle 12. The OCDS 10 may be configured to detect or sense the vertical clearance in the path of the vehicle 12. The OCDS 10 may be configured to generate an alert to a driver in response to a height of the vehicle 12 being less than the vertical clearance. To accommodate one or more objects 20 that are transported above or extend above a roofline of the vehicle 12, the OCDS 10 may be configured to generate an alert in response to a combined height of the vehicle 12 and any objects 20 being transported by the vehicle 12 being greater than the vertical clearance. The total height of the vehicle 12 may include a height of any objects 20 that are transported above the vehicle roofline.

The OCDS 10 may include an OCDS controller (or controller) 14 that is configured to alert the driver in response to determining that the overall height of the vehicle 12 and the object 20 (positioned with or on the vehicle) may contact an external overhead obstacle (e.g., highway overpass, extended rooftop of a drive through, low level parking garage, etc.). The OCDS controller 14 may include a processor 58 that is configured to execute instructions to operate the OCDS 10. The OCDS controller 14 may include a Bluetooth Low Energy (BLE) based transceiver (or transceiver) 16. The OCDS controller 14 may include hardware and software to implement BLE communication protocols. It is recognized that the transceiver 16 may be positioned either internal to the controller 14 or external to the controller 14.

An electronic tag 18 may be positioned on the object 20 that is external to the vehicle 12. For example, the object 20 may be, but is not limited to be, a bike, a trailer, an exterior storage compartment positioned on the vehicle 12, etc. The electronic tag 18 may include a controller 22 and a BLE-based transceiver 24 configured to enable BLE-based communications with the transceiver 16 on the vehicle 12 (or to enable communication with the vehicle 12). The controller 22 and the transceiver 24 may be defined as an advertiser in the BLE environment. The OCDS controller 14 and the associated transceiver 16 may be defined as a scanner in the BLE environment. In general, the OCDS controller 14 may be configured to actively monitor for the tag 18 in response to an ignition switch signal that is indicative of a powertrain of the vehicle 12 being in an on state. The OCDS controller 14 may be programmed to monitor for an advertisement signal (ADV) from each tag 18 that is in proximity to the vehicle 12. The advertisement signal may generally serve as a beacon signal from the tag 18. A presence of the tag 18 and the associated object 20 may be detected when the advertisement signal is received by the OCDS controller 14.

Communication may be initiated by either the OCDS controller 14 or the tag controller 22. The presence of a tag 18 in proximity to the vehicle 12 may be detected by communications being established between the tag 18 and the OCDS controller 14.

In some configurations, the tag controller 22 may be configured to store metadata pertaining to the object. The stored metadata may include a type (e.g., cargo, trailer, etc.) of the object 20, an overall height of the object 20, manufacturer specific data, a label for the object 20, and a location of the object 20 relative to the vehicle 12. The manufacturer specific data may include, but is not limited to, a name of a manufacturer of the object 20 and/or sensor 18, a designated name of the object 20 (e.g., bike, external storage compartment, bike rack, etc.), a unique identification (or ID) for the object 20, etc.

In some configurations, the tag 18 may be permanently affixed to the object 20 or may be an integral part of the object 20. In configurations in which the tag 18 is embedded with the object 20, the metadata may be pre-stored by the object manufacturer. A limitation of this configuration is that the height information must be stored at the time of manufacture of the object 20. Such a configuration relies on the tag being permanently affixed to the object 20. Further, the pre-stored height data does not allow for any variation in how the object 20 is transported. For example, a bike may be transported on the roof of the vehicle or in the bed of a truck. In each case, the height information embedded in the bike sensor would remain constant. In the case of the bike being transported in the bed of the truck, the combined height of the vehicle may be determined as being greater than the actual combined height. This may lead to false warnings or alerts.

In some configurations, the tag 18 may be supplied independent of the object 20. The tag 18 may be a generic BLE module that is capable of being used on a variety of objects 20. A number of generic BLE tags are available that transmit a simple advertisement to advertise the presence of the device. These tags 18 may be small, battery powered devices that communicate via the BLE interface. These tags 18 may be configured to be coupled to objects for a variety of uses such as locating keys or other frequently misplaced objects. For example, generic BLE devices or tags 18 may be coupled to a key chain or pet collars for use with compatible devices such as a mobile phone, a computer, or a tablet. The compatible device may be configured to generate an alert when the BLE tag leaves a predetermined area (e.g., advertisements no longer received). The BLE tags may broadcast a Universally Unique Identification (UUID) along with the advertisement to uniquely identify each of the devices. The advertisement may indicate the presence of the BLE tag 18 in proximity to those modules that are within a predetermined distance to receive the advertisement. Such tags 18 may be affixed to cargo items to identify cargo that is transported by the vehicle 12.

In some configurations, the tag 18 may store no data related to the object 20 that it is affixed to. Stored data may only include data that is specific to the tag 18 itself. For example, each tag 18 may store or retain the UUID that uniquely identifies each of the tags 18, but store no other data. Configuration information associating the tag 18 with the object 20 may be stored in the OCDS controller 14.

In some configurations, the tag 18 may include stored information and the stored metadata may include default values that may be indicative of a generic sensor tag. The tag controller 22 may be programmed to store metadata received from the OCDS controller 14 after a configuration process is performed. The user (or driver) may have the capability of programming the tag 18 to provide the metadata such as the overall height of the object 20, manufacturer specific data, and the location of the object relative to the vehicle 12.

In configurations in which metadata is stored in the tag 18, the OCDS controller 14 may, in response to receiving the advertisement signal (ADV) from the tag 18, transmit a signal scan request (SCAN_REQ) signal to the tag 18. The SCAN_REQ signal may correspond to a request for information (or metadata request) from the tag 18. The information requested may include the stored data described above. The tag 18 may then transmit the stored metadata to the OCDS controller 14 via a scan response (SCAN_RESP) signal. In other configurations, the SCAN_REQ may provide an acknowledgment that the advertisement was received by the OCDS controller 14.

The OCDS 10 may include various systems that interface with the OCDS controller 14 to provide information related to the height of the generally stationary structures. For example, the vehicle 12 may include a forward looking camera system 26 that is configured to provide information regarding the overall height of an external overhead obstacle to the controller 14 when the vehicle 12 is a predetermined distance away from the external overhead obstacle. The OCDS controller 14 may then compare the combined vertical height of the vehicle 12 and the object 20 to the overall height of the external overhead obstacle to determine if there is adequate clearance for the vehicle 12 to pass under the external overhead obstacle. If the clearance will not be adequate and a collision will occur based on the comparison, the OCDS controller 14 may then issue an alert (e.g., audible and/or visual) to the driver to notify the driver to avoid the external overhead obstacle. If the clearance is adequate, no warnings or alerts may be issued. Alternatively, a forward looking radar system 48 may be used in place of or in addition to the forward looking camera 26 to provide information regarding the overall height of the external overhead obstacle to the vehicle 12.

An overhead camera system 28 may also be coupled to the OCDS controller 14. The overheard camera system 28 may capture images of the external overhead obstacle when the vehicle 12 is a predetermined distance away from the external overhead obstacle. The overhead camera system 28 may further include a controller (not shown) that may be configured to provide the overall height of the external overhead obstacle to the OCDS controller 14. The OCDS controller 14 may compare the same to the combined vertical height of the vehicle 12 and the object 20 to determine if there is adequate clearance. As described above, the OCDS controller 14 may issue an alert or warning if the clearance is not adequate. If the clearance is adequate, no warnings or alerts are is sued.

The vehicle 12 may also include a powertrain control module (PCM) 30, a side object detection system 32 (or a side object radar system), and a steering wheel angle controller 34. The PCM 30 may be configured to provide vehicle speed and/or transmission status of the vehicle 12 (e.g., the vehicle in Park, Reverse, Neutral, Driver, and Low). The PCM 30 may also be configured to control the speed of the vehicle 12. The side object detection system 32 may be configured to provide information corresponding to side objects that are detected on a side of the vehicle (e.g., left, right or, rear side of the vehicle 12). The steering wheel angle controller 34 may be configured to provide the steering wheel angle of the vehicle 12. The OCDS controller 14 may use this information to calculate the projected path of the vehicle 12 in relation to its course with the external overheard obstacle and may further use the vehicle speed to determine the distance of the vehicle 12 away from the external overhead obstacle. Likewise, the OCDS controller 14 may not initiate overhead detection until the vehicle speed is in excess of a predetermined vehicle speed. The OCDS controller 14 may use the vehicle speed from the PCM 30 for this purpose. The OCDS controller 14 may also utilize the information from the side object detection system 32 to determine if there are external overhead obstacles that are located on either the right, left or rear sides of the vehicle 12.

The side object detection system 32 may provide information corresponding to the overall height of the side external overhead object to the OCDS controller 14. The OCDS controller 14 may determine if the side external overhead object is relevant based on the steering wheel angle and the vehicle speed. In the event that the vehicle 12 is turning into the side external overhead object, the OCDS controller 14 may adjust the vertical clearance to be that of the side external overhead object. This may be particularly useful for sharp or sudden turns into a parking garage especially when the vehicle 12 turns and travels onto a ramp entrance of the parking structure where the overall clearance of an overhead of the parking entrance is low or alternatively when the clearance of the entrance of the parking garage decreases in relation to the incline of the ramp.

A GPS system 36 may be electrically coupled to the OCDS controller 14. The GPS system 36 may provide location information (or GPS coordinates) of the vehicle 12. Additionally, a navigation system 38 may be electrically coupled to the OCDS controller 14. The navigation system 38 may provide map data of various points of interest in addition to home destination information, etc. Such map data may also include information corresponding to external overhead obstacles and the corresponding heights of the external overhead obstacles that the vehicle 12 may encounter while traveling to the point of interest. The navigation system 38 may also allow a user to manually enter various locations on the map that includes an external overhead obstacle. The user may also manually enter the vertical height for the external overhead obstacle if known. This may be particularly useful for external overhead obstacles that may be located in or about a residence or residential area when GPS coordinates may not be available. The navigation system 38 may provide the height information of the external overhead obstacles to the OCDS controller 14 for comparison to the overall height of the vehicle 12 and the overall height of the object 20.

The OCDS controller 14 may also include a BLE scanner manager circuit 40 that manages BLE-based communication with respect to signals that are transmitted to and received from the tag 18. The tag controller 22 on the tag 18 that is mounted on the object 20 may be configured to manage communication via BLE with respect to signals that are transmitted to and received from the vehicle 12. The OCDS controller 14 may include non-volatile storage for retaining data of interest for the OCDS 10. The OCDS controller 14 may also include a low clearance point of interest (POI) database 42, a persistent object metadata database 44, and a session object clearance database 46. The databases may include information regarding vertical clearance at various locations and tags 18 that have been previously configured along with associated object information.

Figure 2:
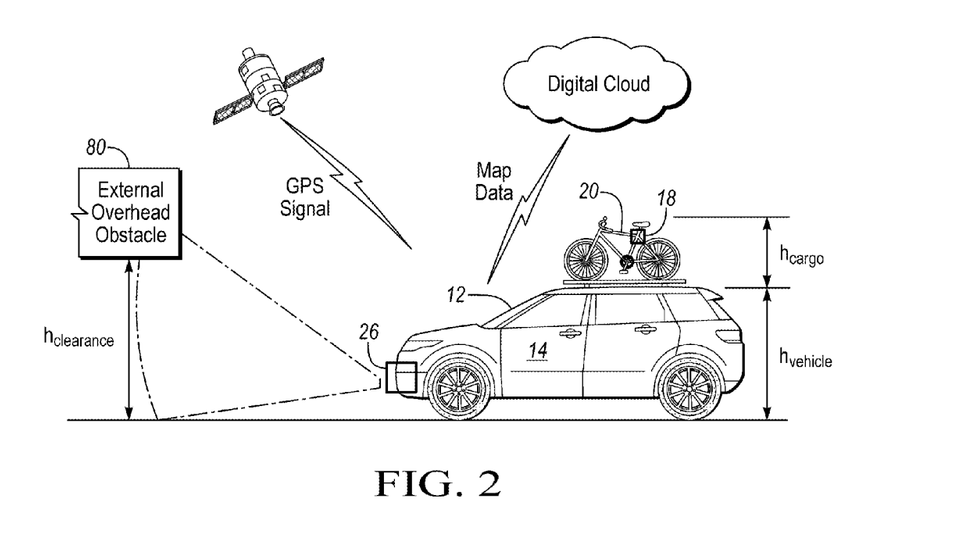
FIG. 2 depicts a vehicle with an object that extends above a roofline of the vehicle.

FIG. 2 depicts one example configuration for a vehicle that includes an OCDS. As shown, the object 20 (or cargo)

in this example is a bike that is mounted on a roof of the vehicle 12. The tag 18 may be coupled to the bike 20. The object 20 may have a predetermined height (i.e., $h_{cargo}$). The height of the object 20 may be determined as described herein. The OCDS controller 14 may include (or store) information corresponding to the height of the vehicle 12 (i.e., $h_{vehicle}$). The OCDS controller 14 may receive data from the forward looking camera system 26. The OCDS controller 14 may determine the overall height of an external overhead obstacle (or external overhead object) 80 (i.e., $h_{clearance}$) that is positioned a distance away from the vehicle 12 based on images from the forward looking camera system 26. The OCDS controller 14 may determine whether $h_{clearance} > h_{vehicle} + h_{cargo}$. If this condition is true, then the OCDS controller 14 may determine that a collision will not occur between the vehicle 12 and the external overhead object 80. If this condition is false, then the OCDS controller 14 may determine that a collision may occur between the vehicle 12 and/or the object 20 with the external overhead object 80. The OCDS controller 14 may generate an alert to notify the driver in order to avoid the external overhead object 80. It is recognized that the vehicle 12 may optionally use the other systems noted in connection with FIG. 1 to determine the presence of the external overhead object 80 and to further obtain the height of the external overhead object 80.

The OCDS 10 may be configured to interface with generic BLE tags 18 that are configured to be attached to the object 20. The tag 18 may be attached to the object 20 by any available means. For example, possible means may include an adhesive or one or more fasteners. The advantage of using generic BLE tags 18 is that object detection may be expanded to any object to which the tag 18 may be attached. Objects with height detection capability may no longer be limited to those objects having sensors including height data embedded by the object manufacturer.

The OCDS controller 14 may be programmed to detect when objects 20 with tags 18 are in proximity to the vehicle 12. When the presence of a tag 18 is detected, various techniques of establishing the total height of the vehicle 12 and the object 20 may be implemented. In some configurations, the vehicle operator may be prompted to enter height data of objects transported above the roofline. The vehicle 12 may include a user interface (UI) module 50, such as one including a touchscreen, that is configured to permit the operator to input height information. In some configurations, the tags 18 attached to the objects 20 may be configured to store and transmit the height of the object.

The user interface module 50 may include a display 52 that is configured to display text and graphics to the operator. The user interface module 50 may include an input module 54 that is configured to accept inputs from the operator. The input module 54 may include buttons, switches, and other input mechanisms. In some configurations, the display 52 may be a touchscreen that also acts as part or all of the input module 54. For example, virtual buttons and keypads may be displayed and input may be obtained by the operator touching the associated area of the touchscreen.

When the presence of tag 18 is detected (e.g., advertisement message is received), the OCDS controller 14 may cause a prompt to be displayed on the display 52. The prompt may request that the operator provide height data for the object 20 that is coupled to the tag 18. The operator may enter the height data via the input module 54. For example, a numeric keypad may be displayed on the touchscreen. In some configurations, the OCDS controller 14 may display height data associated with tags 18 that have previously communicated and configured with the OCDS 10. For example, a list of previous objects and associated height data may be displayed on the display 52. The operator may scroll through the list and select a desired object.

The OCDS controller 14 may include a wireless communications module 56 to communicate with devices and systems remote from the vehicle 12. The wireless communications module 56 may include an onboard modem having an antenna to communicate with off-board devices or systems. The wireless communications module 56 may be a cellular communications device to enable communications via a cellular data network. The wireless communications module 56 may be a wireless local area network (LAN) device compatible with Institute of Electrical and Electronics Engineers (IEEE) 802.11 family of standards (i.e., WiFi) or a WiMax network. The wireless communications module 56 may include a vehicle based wireless router to allow connection to remote networks in range of a local router. The wireless communication module 56 may also be implemented as a component external to the OCDS controller 14 and communicate via a vehicle network to the OCDS controller 14.

In some configurations, the OCDS controller 14 may request height data of the object 20 from a remote device such as a mobile phone or tablet. The remote device 60 may include one or more processors 62 and memory 64. The memory 64 may include volatile and non-volatile memory. The remote device 60 may further include a display screen 68 for providing a user interface. The remote device 60 may further include a wireless communications interface 66 that is capable of communicating via a variety of wireless standards. The wireless communications interface 66 may support Bluetooth/BLE communications and/or WiFi communications standards similar to the wireless communications module 56 of the vehicle 12. The remote device 60 may further include a camera 70.

The OCDS controller 14 may establish and coordinate communication between the vehicle 12, the tag 18, and the remote device 60. Communication between the vehicle 12 and the tag 18 may enable the vehicle 12 to identify and associate the UUID with the object 20 coupled to tag 18. The communication between the OCDS controller 14 and the tag 18 may establish a presence of the associated object 20 on the vehicle 12 or in proximity to the vehicle 12. Communication between the vehicle 12 and the remote device 60 may be utilized to coordinate a measurement of height data for the vehicle 12 and the object 20.

The OCDS controller 14 may establish a communication channel with the remote device 60. A remote device 60 may be paired with the vehicle 12 using established protocols. Communications may be established through a Bluetooth/BLE channel and/or any wireless channel supported by the wireless communications modules 56, 66. Once paired, a communication channel may be established between the vehicle 12 and the remote device 60 when the remote device 60 is in communication range of the vehicle 12.

In some configurations, OCDS-specific message traffic may be initiated when the presence of a tag 18 is detected in proximity to the vehicle 12. An application or program may be executed by the remote device 60 to provide a user interface. In some configurations, OCDS-specific message traffic between the vehicle 12 and the remote device 60 may be initiated by a user of the remote device 60. The remote device 60 may send a request to the OCDS controller 14 for tags 18 that are presently located in proximity to the vehicle 12. The OCDS controller 14 may respond to the request by sending vehicle and tag data to the remote device 60. The data may include previously stored object height data and vehicle height data.

The remote device 60 may include a database of tag/object data and associated height data from previous pairings with the vehicle 12. The database may include a vehicle identifier and tag/object identifiers along with associated height data. The remote device 60 may be configured to communicate with multiple vehicles and manage multiple tag/objects. The remote device 60 may display a list of vehicles and tags/objects to the operator. The operator may then select a vehicle and an object from the list. In some cases, a tag 18 may be identified as being associated with a particular object from a previous connection. The remote device 60 may prompt the operator to confirm that the association is still valid. For example, if the UUID associated with the tag 18 was previously identified as a cargo carrier, the remote device 60 may confirm that the tag 18 is still associated with the same cargo carrier. This may allow tags 18 to be reused on different objects 20 as the need arises.

The OCDS controller 14 may, in response to detecting the presence of a tag 18, transmit a request for height data to the remote device 60. The request may be output to the display 68 of the remote device 60 and the operator may be prompted to provide the height data in a variety of ways. In some configurations, the remote device 60 may be configured to prompt the operator to enter the height data through the display 68. For example, a keyboard/keypad may be displayed that allows the operator to type in the height data. In some configurations, height data for previously configured objects may be stored on the remote device 60. In some configurations, the remote device 60 may prompt the operator to measure the height using the camera 70.

In some configurations, the OCDS controller 14 may output a request to initiate a height measurement of the vehicle 12 and the object 20. The request may be output to the display 52 of the vehicle 12. The request may be output as a message transmitted to the remote device 60.

The OCDS controller 14 may scan for advertisements to detect the objects 20 with the tags 18 that are in proximity to the vehicle 12. The tag 18 may be configured to periodically transmit an advertisement for establishing communications with other devices. When the tag 18 is in proximity to the vehicle 12, the OCDS controller 14 may receive the advertisement. Upon receiving the advertisement, the OCDS controller 14 may send an acknowledgment to the tag 18. The OCDS controller 14 may also store any object data associated with the advertisement such as the UUID.

The OCDS controller 14 may compare the object data to previously stored object data to determine if the tag 18 and associated object 20 has been proximate to the vehicle 12 in the past. Further, the OCDS controller 14 may determine if the height of the object 20 associated with the tag 18 has been previously stored. The OCDS controller 14 may prompt the operator via the user interface 50 when a tag 18 is detected. For example, the OCDS controller 14 may provide an announcement of the tag 18 via the user interface 50. The announcement may include an indication that the tag 18 has been in proximity to the vehicle 12 in the past. Further, the last known object height associated with the tag 18 may be displayed. Instructions may be provided to the operator regarding the procedure for updating the height associated with the object 20 coupled to the tag 18. The user interface may provide a selection for the operator to change the height associated with the tag 18.

Additionally, the user interface 50 may be configured to allow the operator to input a label to associate with the tag 18. For example, the operator may be permitted to type in a text label, such as 'bike' or 'cargo carrier', to associate with the tag 18 via the user interface 50. The label may be stored along with the height data and tag identification data.

In response to determining that the height associated with the tag 18 should be changed, the OCDS controller 14 may issue a request to the remote device 60. In some configurations, the OCDS controller 14 may issue a request to the operator via the user interface 50 to initiate an application on the remote device 60.

The application executed on the remote device 60 may send a request for the vehicle 12 to transfer object information to the remote device 60. In response, the OCDS controller 14 may send the object information via the wireless communication link. The OCDS controller 14 may also send vehicle information such as vehicle height to the remote device 60. In other configurations, the vehicle information may include a make and model of the vehicle 12 and the remote device 60 may retrieve vehicle height information from a database based on the make and model.

In the event that more than one tag 18 is in proximity to the vehicle 12, the remote device application may prompt the operator to select an object 20. The objects 20 may be displayed in a list or table. The operator may select the object 20 by using the touchscreen or scrolling through the list and pressing a button. The operator may be reminded to select the object that extends furthest above a top of the vehicle 12. Once the object 20 is selected, a height measurement may be initiated.

The remote device application may provide an interface to the camera 70 of the remote device 60. The display screen 68 may be configured as the viewfinder of the camera 70. The operator may be prompted to take a picture of the vehicle 12 and object 20. For example, the operator may adjust the camera position such that the vehicle 12 and the object 20 are present on the screen 68. The operator may press a button to store the image for later processing. The button may be a physical button or a virtual button on the touch screen.

Figure 3:
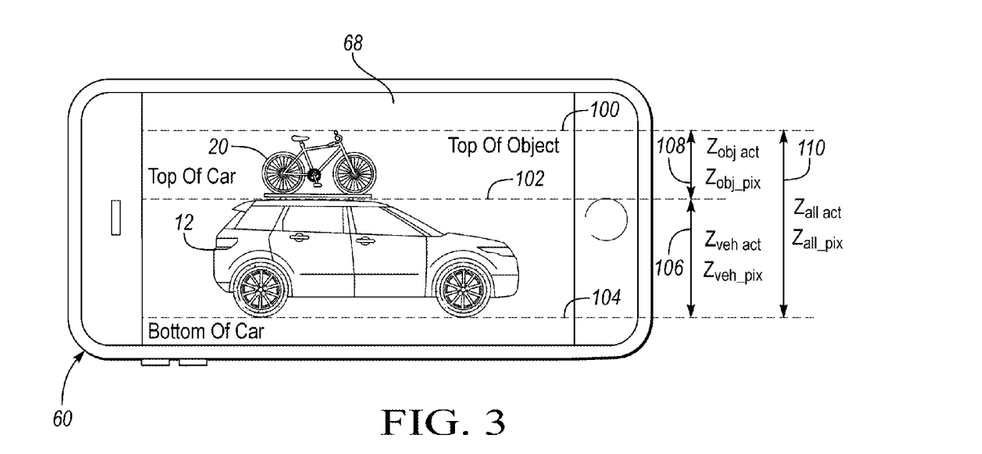
FIG. 3 depicts a possible height measurement screen configuration on a remote device.

FIG. 3 depicts a possible display screen for assisting with the height measurement. Although depicted on a screen 68 of a remote device 60, the same configuration may be implemented on a display screen in the vehicle. When the image is stored, the remote device application may implement a post-processing function. The stored image of the vehicle 12 and object 20 may be retrieved and displayed on the screen 68. In addition, a plurality of reference lines may be superimposed on the image. A first reference line 100 may be placed to represent the top of the object 20. A second reference line 102 may be placed to represent the top of vehicle 12. A third reference line 104 may be placed to represent a bottom of the vehicle 12.

In some configurations, the third reference line 104 may be expected to be placed on a plane at which the tires meet the ground. The second reference line 102 may be expected to be placed on a plane at the top of the vehicle 12. The first reference line 100 may be expected to be placed on a plane at the top of the object 20. The reference lines may be configured to be moved by the operator. The operator may be prompted to move the reference lines to the proper location. The reference lines may include labels to identify the expected position of the reference lines. The operator may move the reference lines by placing a finger or pointing device on the reference line and sliding in the desired direction to the appropriate position. In some configurations, the image may be rotated to align the planes to the reference lines 100, 102, 104.

In some configurations, the reference lines 100, 102, 104 may be automatically placed by the remote device application. Image processing routines may be executed to identify the vehicle 12 and wheels and automatically place the reference lines 100, 102, 104 on the display 68. The operator may still be permitted to fine tune the placement of the reference lines 100, 102, 104. The user interface may limit the placement of the reference lines 100, 102, 104 such that the relative positioning of the reference lines 100, 102, 104 on the screen is limited (e.g., first reference line 100 cannot fall below the second reference line 102).

Once the reference lines 100, 102, 104 are placed in the desired position, the object height may be processed. The operator may finalize the placement by pressing a button to end the placement process. After the reference line placement is finalized, the height of the object may be determined. The reference line placement may provide several height measurement values based on differences between the reference line placements. The screen may be made up of a grid of horizontal and vertical pixels. If the reference lines 100, 102, 104 are placed horizontally, then the number of vertical pixels between the reference lines 100, 102, 104 represents the distance between the reference lines 100, 102, 104. A vehicle height distance 106 may be represented by the number of pixels between the second reference line 102 and the third reference line 104. An object height distance 108 may be represented by the number of pixels between the first reference line 100 and the second reference line 102. A combined height distance 110 may be represented by the number of pixels between the first reference line 100 and the third reference line 104.

The height of the object may be determined by ratios. The distance between the reference lines 100, 102, 104 on the display may be determined in relative terms such as pixels. For example, a vehicle height distance 106 in the image ($Z_{veh\_pix}$) may be described as the number of pixels between the second reference line 102 and the third reference line 104. The actual vehicle height ($Z_{veh\_act}$) is generally known and may be described in standard distance measurements such as meters, inches, or feet. This information provides an estimate of the number of pixels for a given height value.

The object height distance 108 in the image ($Z_{obj\_pix}$) may be expressed in pixels as the number of pixels between the first reference line 100 and the second reference line 102. The ratio of the object height distance to the vehicle height distance is equivalent when expressed in distance units or in image units as follows:

$$\frac{Z_{obj\_act}}{Z_{veh\_act}} = \frac{Z_{obj\_pix}}{Z_{veh\_pix}} \quad (1)$$

where $Z_{obj\_act}$ represents the actual height of the object in distance units, $Z_{veh\_act}$ represents the actual height of the vehicle in distance units, $Z_{obj\_pix}$ represents the height of the object in screen units (e.g., pixels), and $Z_{veh\_pix}$ represents the height of the vehicle in screen units. The height of the object in distance units (e.g., meters, feet) may be computed as follows:

$$Z_{obj\_act} = \frac{Z_{obj\_pix} Z_{veh\_act}}{Z_{veh\_pix}} \quad (2)$$

Since the actual vehicle height ($Z_{veh\_act}$) is known and the image heights are determined from the image, the object height may be computed. In addition, a combined or total height of the vehicle and the object may be computed by summing the vehicle height and the object height. In some configurations, the object height is computed by the remote device 60 and communicated to the OCDS controller 14. In some configurations, the image heights in pixels may be communicated to the OCDS controller 14 and the OCDS controller 14 may compute the object height. In some configurations, the remote device 60 may send the image to the OCDS controller 14.

The remote device application may further prompt the operator to provide a name to be associated with the object 20. For example, the operator may label the object as a bike or cargo carrier. Further, the operator may be prompted to input a location associated with the object 20. For example, the operator may label the location as roof, back, or trailer. The data associated with the object 20 may be communicated to the OCDS controller 14. The OCDS controller 14 may store the object data in non-volatile memory for retrieval during subsequent ignition cycles. The OCDS 10 may utilize the height data to generate the alert.

In the event of multiple tags 18 being detected by the OCDS controller 14, the OCDS controller 14 may prompt the operator to confirm that the objects 20 are affixed to the vehicle 12. When multiple tags 18 are detected that have previously stored information, the OCDS controller 14 may compute the height based on the object having the greatest height value.

A benefit of the disclosed system is that generic tags 18 may be affixed to objects by the operator. The system may then be calibrated for each tag 18 by the disclosed sequence of operations. The system allows tags 18 to be reconfigured for placement on different objects. The system permits automatic detection of objects 20 that may extend above the roof line of the vehicle 12 and allows for calibration of the object 20. Further, in cases in which an object 20 has already been calibrated, it may be repeatedly used without recalibrating.

Figure 4:
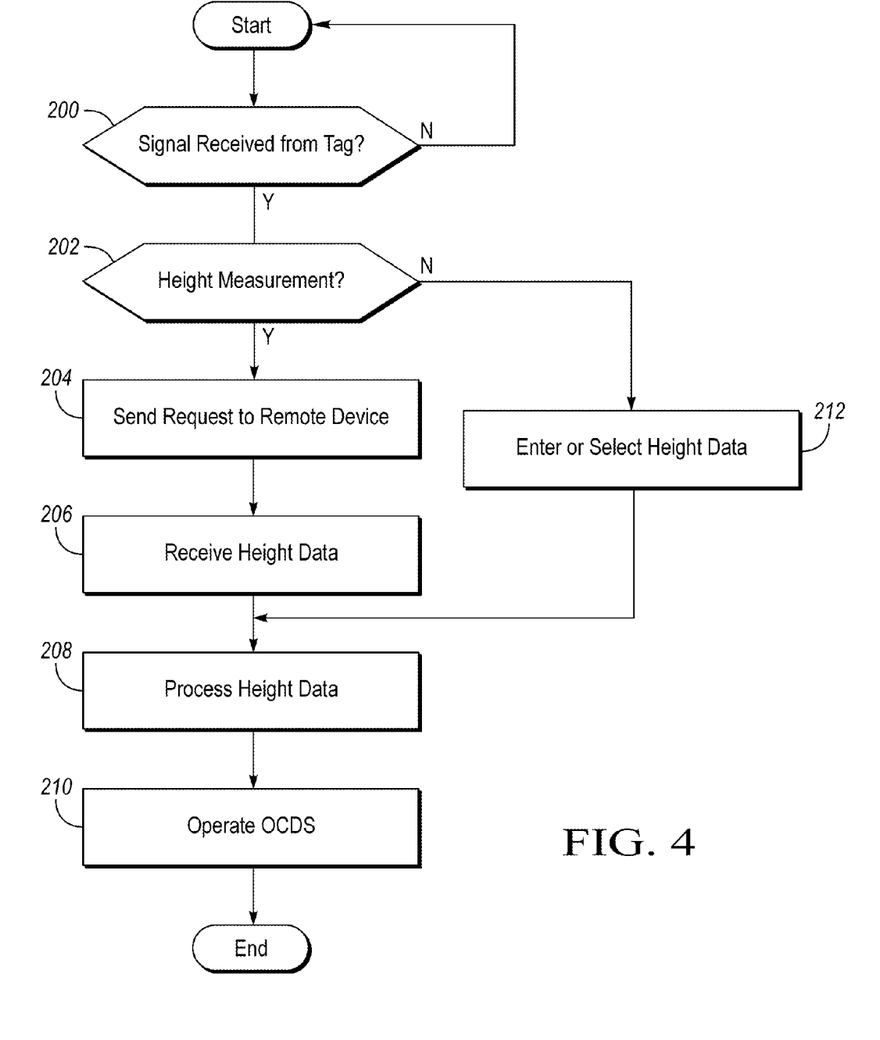
FIG. 4 depicts a possible flow chart for implementing a height measurement request for a controller implementing an object clearance detection system in a vehicle.

FIG. 4 depicts a flowchart for a possible sequence of operations for the OCDS controller 14 in the vehicle 12. After startup, operation 200 may be implemented to determine if a signal is received from the tag 18. A signal may be received when the tag 18 is within a predetermined distance of the vehicle 12. Once the tag 18 is detected, operation 202 may be implemented to determine if a height measurement is desired. Instructions may be executed to determine if previously stored height data is available for the tag 18. The operator may also be prompted to determine if a height measurement should be initiated. If no height measurement is desired, operation 212 may be implemented to allow height data to be entered or selected. If a height measurement is selected, operation 204 may be implemented to send a request to the remote device 60 to receive height data from the remote device 60. Operation 206 may be implemented to receive height data from the remote device 60.

After the height data is determined at operations 206 or 212, the height data may be processed to provide a combined height of the vehicle 12 and the object 20 to the OCDS 10 at operation 208. At operation 210, the OCDS 10 may be operated according to the combined height. The OCDS 10 may generate an alert when the combined object and vehicle heights exceeds a sensed vertical clearance.

Figure 5:
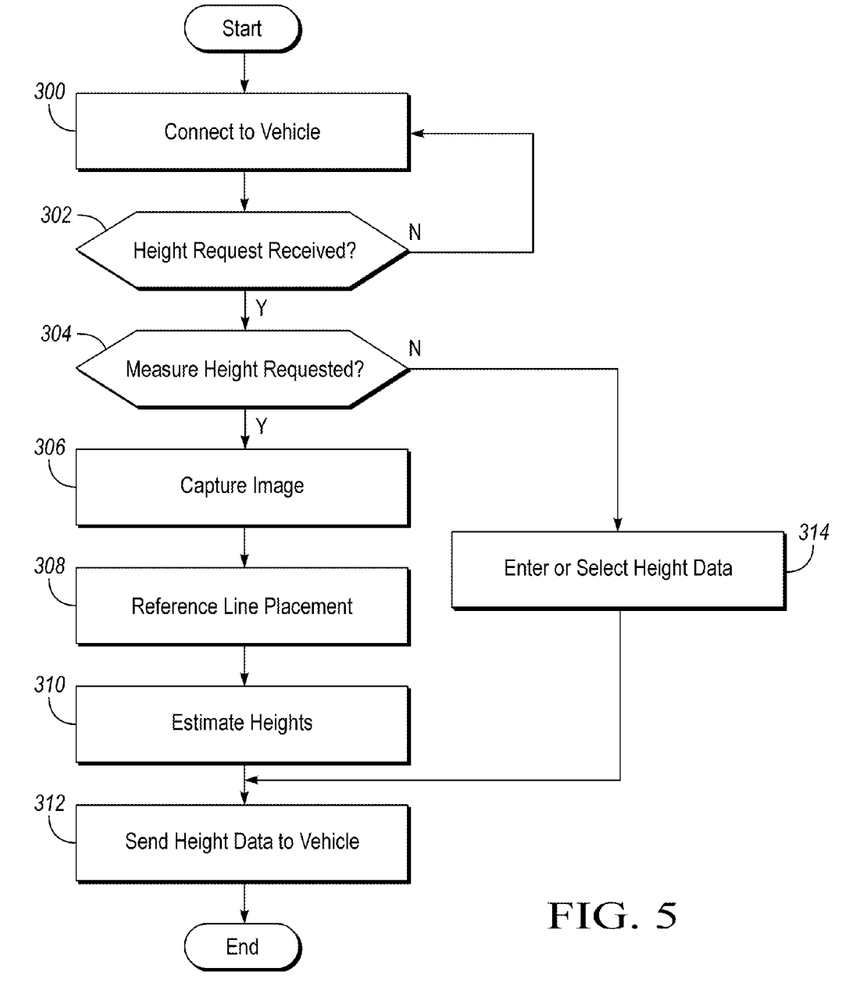
FIG. 5 depicts a possible flow chart for implementing a height measurement request in a remote device.

FIG. 5 depicts a flowchart for a possible sequence of operations for the remote device 60. At operation 300, a wireless communication connection may be established with the vehicle 12. At operation 302, messages from the vehicle 12 may be monitored to determine if a height request is received. If a height request is received, operation 304 may be implemented to determine if a height measurement is desired. If a height measurement is not desired, operation 314 may be implemented to allow entry or selection of the height data.

If a measurement is desired, operation 306 may be implemented to capture an image of the vehicle 12 and the object 20. Operation 308 may then be implemented to superimpose the reference lines over the image and allow placement of the reference lines by the operator. Operation 310 may be implemented to estimate the height data based on the finalized reference lines. After height data is determined by operations 314 or 310, the height data may be transmitted to the vehicle 12 at operation 312.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An overhead clearance detection system for a vehicle comprising:
a controller programmed to, in response to receiving a signal from a wireless transceiver coupled to an object in proximity to the vehicle, transmit a request to a remote device to measure an object height above a top of the vehicle and, after receiving height data from the remote device, output an alert when combined object and vehicle heights exceed a sensed vertical clearance.

2. The overhead clearance detection system of claim 1 wherein the height data includes an image containing the vehicle and the object and the controller is further programmed to generate the combined object and vehicle heights based on the image.

3. The overhead clearance detection system of claim 1 wherein the height data includes the object height above the top of the vehicle.

4. The overhead clearance detection system of claim 1 wherein the height data includes the combined object and vehicle heights.

5. The overhead clearance detection system of claim 1 wherein the signal includes an identifier that is associated with the object and the controller is further programmed to store the identifier and associated height data in non-volatile memory of the controller.

6. The overhead clearance detection system of claim 5 wherein the controller is further programmed to, in response to receiving the signal, compare the identifier with stored identifiers and, when the identifier matches one of the stored identifiers, output a prompt to a user interface permitting an operator to select between operating with stored height data associated with the one of the stored identifiers and requesting a measurement of the object height.

7. The overhead clearance detection system of claim 1 wherein the controller is further programmed to receive a user assigned object name associated with the object from the remote device and store the user assigned object name in non-volatile memory of the controller.

8. The overhead clearance detection system of claim 1 wherein the height data includes a pixel height of the object and a pixel height of the vehicle.

9. The overhead clearance detection system of claim 8 wherein the height data includes a ratio of the object and vehicle heights.

10. A vehicle comprising:
a controller programmed to, in response to receiving a signal from a wireless transceiver coupled to an object in proximity to the vehicle, transmit a request to a remote device to send height data for the vehicle and the object and, after receiving the height data, output an alert when a combined height of the vehicle and the object exceeds a sensed vertical clearance.

11. The vehicle of claim 10 wherein the height data includes an image depicting the vehicle and the object.

12. The vehicle of claim 11 further comprising a display, wherein the controller is further programmed to output the image to the display and superimpose operator moveable reference lines corresponding to a wheel-ground interface, a top of the vehicle and a top of the object on the image.

13. The vehicle of claim 12 wherein the controller is further programmed to compute a height of the object based on a ratio of pixel distances between the moveable reference lines.

14. The vehicle of claim 10 wherein the height data includes the combined height.

15. The vehicle of claim 10 wherein the controller is further programmed to send height data for the object to the wireless transceiver coupled to the object.

16. A method comprising:
receiving, by a controller, a signal indicative of a presence of an object in proximity to a vehicle;
requesting, by the controller, a remote device to provide height data;

receiving, by the controller, height data from the remote device; and outputting, by the controller, an alert when a combined height of the vehicle and the object derived from the height data is greater than a measured vertical clearance.

17. The method of claim 16 further comprising capturing, by the remote device, an image that includes the vehicle and the object.

18. The method of claim 17 further comprising superimposing, by the remote device, a plurality of reference lines on the image, wherein the reference lines correspond to a top of the vehicle, a bottom of the vehicle, and a top of the object, and estimating a height of the object based on the image and the reference lines.

19. The method of claim 17 wherein the height data includes the image.

20. The method of claim 19 further comprising, processing, by the controller, the image to estimate the combined height.

* * * * *